July 7, 1970     F. W. SCHNEIDER ET AL     3,518,819
BRUSH PICKUP
Filed Feb. 13, 1967     2 Sheets-Sheet 1
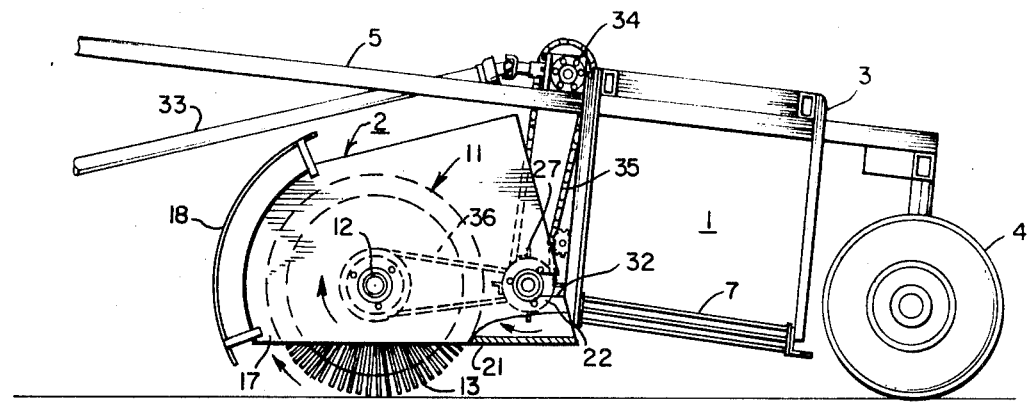
FIG. 1
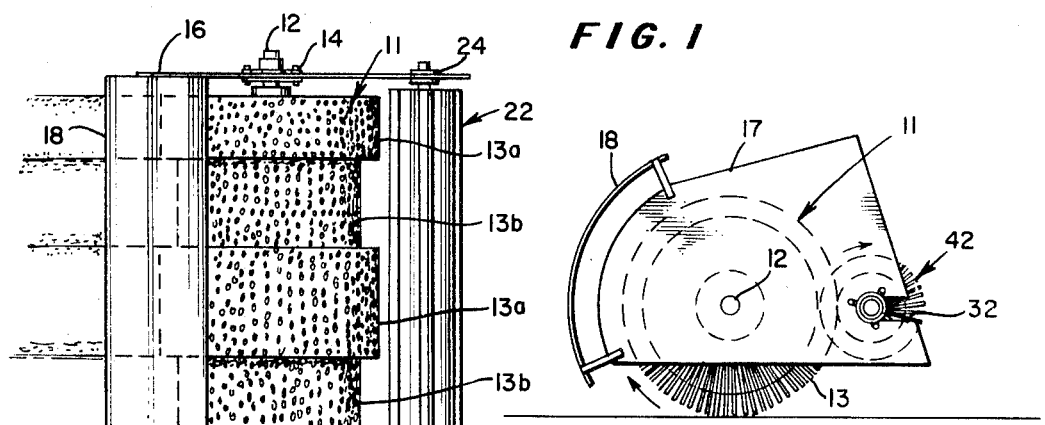
FIG. 2
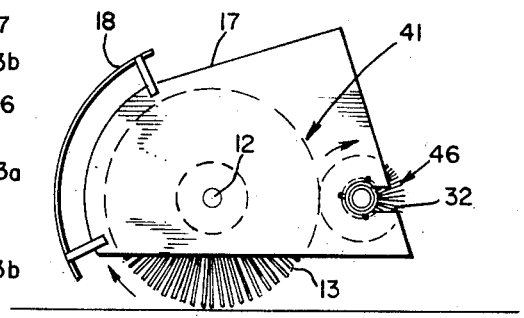
FIG. 3
FIG. 6
INVENTORS
FRED W. SCHNEIDER
WILLARD E. MORRIS
BY
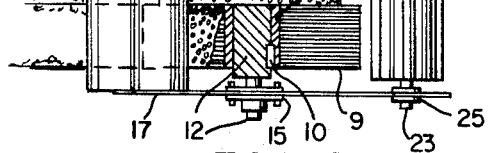
ATTORNEYS

United States Patent Office 3,518,819
Patented July 7, 1970

3,518,819
BRUSH PICKUP
Fred W. Schneider, Mitchell, and Willard E. Morris, Gering, Nebr., assignors, by mesne assignments, to Lockwood Corporation, Gering, Nebr., a corporation of Delaware
Filed Feb. 13, 1967, Ser. No. 615,474
Int. Cl. A01d 43/02
U.S. Cl. 56—344                              11 Claims

---

ABSTRACT OF THE DISCLOSURE

A brush pickup assembly for vegetation disposed on a field surface, inclusive of a brush member having bristles of a special construction and configuration disposed in ground contacting relation. One or a pair of associated driven rotary members are disposed in proximity to the brush member to move the vegetation elevated by the brush member to a rearward disposal point. A cover member disposed forwardly of the brush member directs the vegetation elevated by the brush member over its forward surface.

---

This invention relates to pickup apparatus and more particularly to rotary brush pickup assemblies suitable for recovering from the field various types of agricultural crops and crop foliage.

In agricultural husbandry operations there are many crop and field conditions which lend themselves to the use of a sweeping or pickup apparatus to remove crops and foliage thereof from the field. Frequently, the crop has been knocked down or fallen to the ground as wheat or the like after a hailstorm. In other instances in the harvesting process, the foliage is cut and scattered over the field, such as beet tops and the like which are valuable as a feed.

Accordingly, it is an object of this invention to provide a simple, durable and easy to use rotary brush assembly suitable for picking up a variety of crops and crop foliage from the fields and discharging it at a suitable takeaway point.

Another object of this invention is to provide a brush pickup assembly which may be conveniently attached to various types of farm machinery for use therewith, such as a windrower and the like.

It is a further object of this invention to provide a novel brush pickup assembly of sectional members which is adapted for the contour of the field, particularly row crop planting, for even brush pickup and is easily repairable if excessive wear occurs on a particular portion of the brush by replacement of one or more sections as required.

Other objects, advantages and capabilities of this invention will become apparent from the following description taken in conjunction with the drawings in which like numerals are employed to designate like parts throughout. In the drawings:

FIG. 1 is a side elevation veiw of a rotary brush pickup assembly mounted forwardly of a pull-type windrower vehicle embodying this invention;

FIG. 2 is a top plan view of the rotary brush pickup assembly omitting the associated windrower shown in FIG. 1 and drawn to an enlarged scale;

FIG. 3 is a side elevation view of another rotary brush pickup assembly embodying this invention having detachable bristle sections of different diameter and a rearward coacting elevating rotary brush having bristle sections of differing diameters;

FIG. 6 is a side elevation view of another brush pickup assembly embodying this invention having smooth bristle surfaces and a rearward coacting elevating rotary brush having smooth bristle surfaces;

Figure 4:
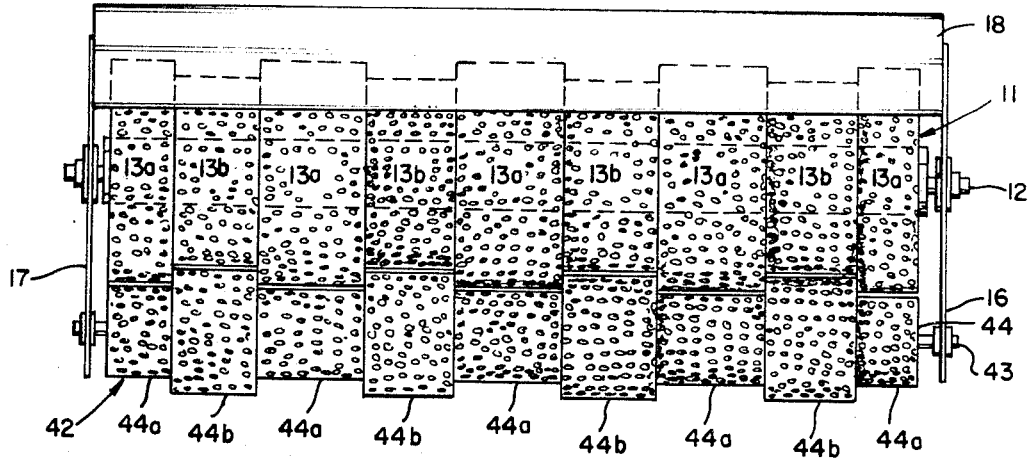
FIG. 4 is a top plan view of the rotary brush pickup assembly shown in FIG. 3 drawn to an enlarged scale.

Referring now to FIG. 1 of the drawings, there is shown in general a vehicular body 1 having a rotary brush pickup assembly 2 supported at its forward end for movement of the pickup assembly over a cultivated field. Various forms of agricultural vehicular bodies of the self-propelled or pull type may be employed as the vehicular means and a windrower pull-type arrangement is illustrated and described herein for a complete understanding of the crop pickup apparatus embodying the present invention.

The windrower shown in FIG. 1 includes an upright frame 3 supported for movement at its rearward end by a wheel and axle assembly 4 and having a hitch bar 5 at its forward end for attachment to a suitable self-propelled vehicle such as a tractor (not shown) or the like. An endless conveyor assembly 7 is supported from the frame 3 which is disposed substantially above the ground surface and forwardly of the wheel and axle assembly 4 which extends transversely of the crop row over which it is carried.

The rotary brush pickup assembly 2, as more particularly illustrated in FIG. 2, includes an elongated cylindrical brush member 11 inclusive of a central shaft or rotary core 12 having supported thereon a radially extending brush portion 13. The brush portion 13 is formed of a plurality of detachable and separable brush sections 13a and 13b disposed in end abutting relationship. Each of the brush sections 13a and 13b is illustrated in FIG. 2 and includes an inner base or hub portion 8 in which there is embedded or otherwise secured the inner ends of radially extending bristles 9. Bristles 9 are of substantially the same length for each section so that the exposed peripheral surface of the brush member 11 has bristles distributed substantially uniformly above its circumferential extent. The core portion 12 fits into base portion 8 in concentric close fitting relationship and is detachably secured thereto as by a key 10 to facilitate ease in removal and replacement of one or more brush sections in the event of excessive bristle wear at particular spots on the brush member.

Brush sections 13a are disposed at each end of the brush member inwardly of the end portions of the shaft with alternate sections 13b and 13a disposed therebetween. Sections 13a are of uniform diameter and of a greater diameter than sections 13b to more readily contact the surfaces between crop rows while the sections 13b are spaced and arranged to travel along plant rows. This arrangement provides a more efficient pickup of vegetable matter where row crop planting has been used.

The end portions of shaft 12 are rotatably supported in bearings 14 and 15 mounted on side panels 16 and 17 which shield the ends of the brush member and are secured to the windrower frame 3 to support the brush member 11 for rotation about a substantially horizontal axis with the undersurface of the bristle portion 13 in ground contacting relation.

A cover member 18 is disposed forwardly and over a portion of the brush member 11 and extends between the side panels 16 and 17 and is rigidly secured thereto.

Cover member 18 is generally arcuate in shape so that its inner surface is spaced a substantially uniform distance from the peripheral surface of the brush member 11 along its lengthwise extent.

The spaced side panels 16 and 17 support a deck member 21 which is disposed in a generally horizontal plane above and in proximity to the field surface and having its leading edge adjacent the rearward undersurface of the brush and extending rearwardly therefrom. Deck member 21 receives vegetation swept from the field and carried over the brush member by deposit or impaling on the exposed bristles of the brush member as described more fully hereinafter.

A rotary member 22 is supported for rotation rearwardly of the brush member 11 by panels 16 and 17 and above the deck member 21 with its axis of rotation in a plane parallel to the axis of rotation of the brush member. Rotary member 22 includes a central shaft 23 having its end portions supported in bearings 24 and 25 in the panels 16 and 17, respectively, and a roller or core 26 supported on the shaft 23. A plurality of blades or kicker bars 27 are disposed on the peripheral surface of the roller having portions extending radially therefrom at 90° intervals having their exterior surfaces in close proximity to the periphery of the bristles and the upper surface of the deck member so as to intercept and kick or impel vegetation elevated by the brush member and discharged thereon or collected on the deck member and thereby move it rearwardly and onto the conveyor assembly 7 when driven in a clockwise direction as hereinafter described. The preferred shaping of blades 27 is a right-angle section as shown. The panel members 16 and 17 are preferably slotted along rearward sides as shown at 32 to permit ease in removal of the rotary member 22 from assembly for repair and replacement purposes.

The drive train for rotating brush member 11 and rotary member 22 includes the power take-off shaft 33 from the pulling vehicle coupled to a chain sprocket 34 supported at the top of the windrower frame 3. Rotary motion imparted to the sprocket 34 is transmitted to a sprocket (not shown) on shaft 23 by transmission means 35, preferably a link chain, to rotate member 22 in a clockwise direction as viewed in FIG. 1 and from shaft 23 the rotary motion is transmitted to brush member 11 by a transmission means 36 to rotate the brush member in a clockwise direction as viewed in FIG. 1.

This positive drive on brush member 11 and rotary member 22 provides an initial sweeping action of the field surface by deposit or impaling on the exposed bristles of the brush and impels the vegetation first upwardly between the forward peripheral surface and the cover member 18 and then rearwardly over its top surface and then downwardly over its rearward surface with a major portion of the vegetation falling onto the rotary member so that the rotating blade members 27 can then impel it reawardly onto the take-away conveyor 7. A portion of the vegetation which accumulates on the deck member 21 below the rotary member 22 is also impelled upwardly between brush member and rotary member 22 and rearwardly onto the take-away conveyor 7.

Figure 5:
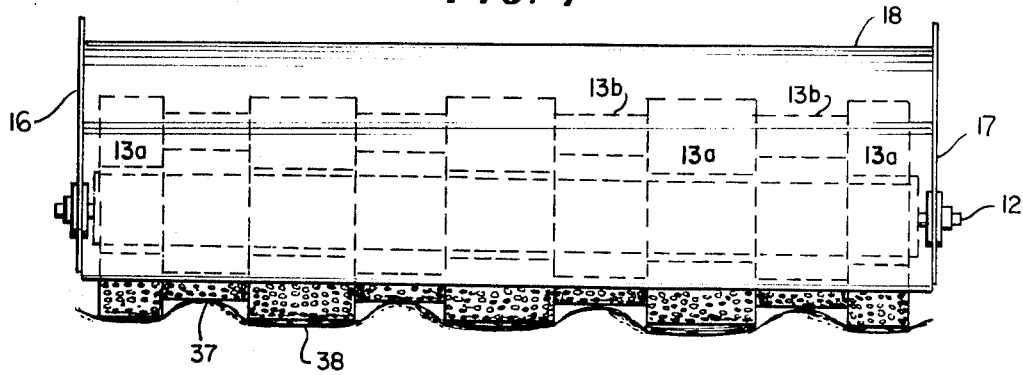
FIG. 5 is a front elevation view of the rotary brush pickup assembly shown in FIG. 4 illustrating the relationship of the bristles with the crop row surface.

Referring now to FIGS. 3–5, there is shown another form of rotary brush pickup having the same side panels 16 and 17 supporting for rotation a similar brush member 11 having sections 13a and 13b of different diameters as shown in FIG. 2. An alternate form of rotary member 42 is illustrated in FIGS. 3–5 which in general is a brush-type member having a central shaft or core portion 43 and supported thereon radially extending brush portions 44 having a central base portion in which there is embedded radially extending bristles similar to the rotary sweep brush member 11 previously described which permits easy replacement of selected of said sections in the event of excessive wear.

The brush portion 44 comprises a plurality of separable sections 44a and 44b disposed in alternating end abutting relationship. Brush sections 44a are disposed at each end with alternate sections 44b therebetween. Sections 44a are of lesser diameter than sections 44b. Sections 44a are approximately the same width as corresponding adjoining sections 13a on the sweep brush member 11 and sections 44b are approximately the same width as corresponding adjoining sections 13b and the adjoining surfaces of which are in closely spaced relationship to limit the amount of vegetation or crops which may pass therebetween during their conjoint rotation. A crop row having alternating peaks 37 and valleys 38 is illustrated in FIG. 5 with the relationship of the periphery of the bristles of sections 13a and 13b shown to illustrate the more even pickup during the ground sweeping rotation of a brush member for this form of crop row.

Figure 7:
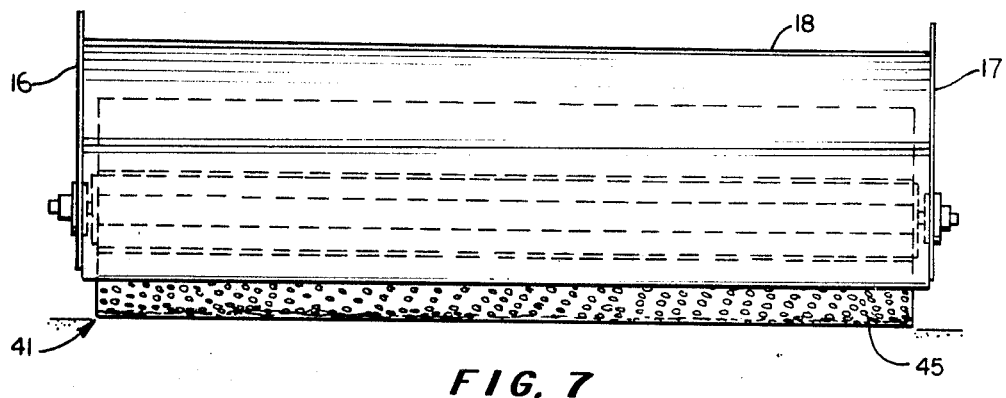
FIG. 7 is a front elevation view of the rotary brush pickup assembly shown in FIG. 6 illustrating the relationship of the bristles with the surface being contacted.

In FIGS. 6 and 7 there is shown an alternative form of rotary pickup using a brush member 41 having the radial extent of the bristles 45 of substantially uniform length throughout its lengthwise extent with a rearward rotary member 46 similarly having bristles of substantially uniform length throughout its lengthwise extent and having the same direction of rotation as the arrangements previously described in FIGS. 1–5. The bristles 45 may be continuous along its lengthwise extent with a single central hub detachably keyed to the shaft as shown or made in circumferential sections of uniform diameter to facilitate replacement of only portions having excessive wear. This rotary brush pickup assembly is more suitable for sweeping applications of fields having substantially flat surfaces.

Figure 8:
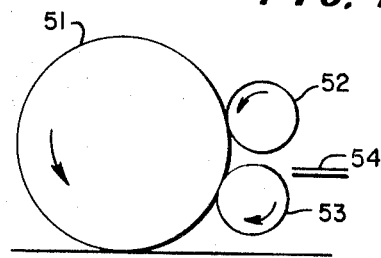
FIG. 8 is a schematic diagram illustrating another form of rotary brush assembly embodying our invention using a reverse rotation of the forward sweep brush and plural trailing rotary brushes.

Referring now to FIG. 8, there is schematically illustrated another form of rotary pickup assembly inclusive of the forward rotary sweep brush member 51 of similar construction to brush members 11 or 41 previously described rotated by its associated drive (not shown) in an opposite direction or counterclockwise as viewed in FIG. 8 so as to impel the vegetation or crop rearwardly. Rearwardly of the sweep brush member 51 there is provided upper and lower rotary members 52 and 53, respectively, which may be similar in construction to rotary members 22 and 42 previously described and which rotate in opposite directions to impel the elevated material rearwardly to a suitable conveying surface 54.

The lower rotary member 53 rotates in a direction oppositely of rotary member 52 and sweep brush member 51 to impel the elevated material between the adjoining peripheral surfaces to a suitable take-away conveyor.

We claim:

1. A brush pickup assembly for movement over a cultivated field comprising an elongated cylindrical brush member having bristles distributed substantially uniformly about its circumferential extent, means for supporting said brush member from a vehicle for rotation of said brush member about a substantially horizontal axis with its undersurface in ground-contacting relation, means for rotating said brush for elevating vegetation disposed on the field surface by deposit or impaling on exposed bristles of the brush, and driven rotary means supported by said vehicle rearwardly of the brush member and including a pair of spaced cylindrical brush members rotated oppositely and disposed to intercept the vegetation elevated by the brush member and to direct it rearwardly from the brush member.

2. A brush pickup assembly for movement over a cultivated field comprising an elongated cylindrical brush member having bristles distributed substantially uniformly about its circumferential extent, means for supporting said brush member from a vehicle for rotation of said brush member about a substantially horizontal axis with its undersurface in ground-contacting relation, means for rotating said brush forwardly and upwardly for elevating vegetation disposed on the field surface by deposit or impaling on exposed bristles of the brush, an arcuate enclosure supported from the vehicle forwardly of the brush and having its lower edge in closely spaced relation to the surface over which the vehicle moves and having its top edge substantially higher than the top of the brush for confining elevated material in proximity to the brush until it is directed downwardly, a kicker wheel adjacent a descending peripheral surface of the brush for removal of adhering material therefrom, and a driven rotary member supported by said vehicle rearwardly of the brush member and disposed to intercept the vegetation elevated by the brush member and to move it to a rearward point of discharge.

3. A brush pickup assembly as set forth in claim 2, wherein said driven rotary member has its circumferential surface above the ground surface.

4. A brush pickup assembly as set forth in claim 2, wherein said brush member and said driven rotary member are rotated in the same direction with their ascending surfaces facing forwardly.

5. A brush pickup assembly as set forth in claim 2, wherein said brush assembly and driven rotary member are rotated in opposite directions with the ascending bristle surfaces of the brush member facing rearwardly.

6. A brush pickup assembly as set forth in claim 2, wherein said driven rotary member includes a generally cylindrical core of substantially lesser diameter than said brush member and having circumferentially spaced blade means extending radially therefrom at spaced intervals of its periphery.

7. A brush pickup assembly as set forth in claim 2, wherein said driven rotary member comprises a second brush member of substantially lesser diameter than said ground-contacting brush member and having radially extending bristles.

8. A brush pickup assembly for movement over a cultivated field comprising an elongated cylindrical brush member formed by separable sections of at least two groups of different diameter, means for supporting said brush member assembly of sections from a vehicle for rotation about a substantially horizontal axis with its undersurface in ground-contacting relation, a cover member on said support means disposed forwardly and over said sectional brush members in closely spaced relation thereto, means for rotating said brush for elevating vegetation disposed on the surface in an upward movement beneath said cover member, and a driven rotary member supported by said vehicle rearwardly of the brush member for removing the vegetation raised by the brush member therefrom and for directing it to a rearward point of discharge.

9. A brush pickup assembly for agricultural husbandry operations comprising vehicular means for movement over a cultivated field, an elongated cylindrical brush member mounted at a forward end of said means for rotation about a horizontal axis in ground-contacting relation, said brush member having elongated flexible bristles distributed substantially uniformly about its circumferential extent with a major portion of their outer ends in a common plane for elevating fallen vegetation from the surface over which the vehicle moves, a cover member on said means disposed forwardly and over said brush member in closely spaced relation thereto for confining said elevated vegetation, said elevating movement by the brush member and the confining action by the cover member causing said elevated vegetation to be impaled on bristles of the brush which then is directed by the brush in a following descending movement, a deck member mounted on said vehicular means in close proximity to the surface over which said vehicle moves having its forward end adjacent an undersurface of the brush member and its rear end distant therefrom, a material elevating member disposed along the rear end of the deck member in contacting relation to descending bristles of the brush for discharging impaled vegetation and other material deposited on the deck member by the brush member at the rear of said brush member, and means on the vehicle for rotating said brush member.

10. A brush pickup assembly as set forth in claim 9, wherein said elevated vegetation is directed by said elevating member to discharge and a takeaway conveyor is disposed lengthwise of said elevating member to assist said discharge action.

11. A brush pickup assembly as set forth in claim 9, wherein said elevated vegetation is directed by said elevating member to the takeaway conveyor portion of a windrower assembly.

References Cited

UNITED STATES PATENTS

| | | | |
|---|---|---|---|
| 1,896,626 | 2/1933 | Innes | 56—364 |
| 2,209,853 | 7/1940 | Shuler | 15—82 X |
| 2,133,143 | 10/1938 | Innes | 56—364 |
| 2,155,543 | 4/1939 | Grignolo. | |
| 2,463,061 | 3/1949 | Small | 56—364 |
| 2,516,600 | 7/1950 | Shipley et al. | 15—55 |
| 2,719,312 | 10/1955 | Hyland | 15—55 |
| 2,732,573 | 1/1956 | Hyland | 15—82 |
| 2,928,224 | 3/1960 | Powell | 56—28 |
| 3,055,162 | 9/1962 | Phillips | 56—364 |
| 3,131,526 | 5/1964 | Burnham | 56—328 |

ROBERT PESHOCK, Primary Examiner

J. A. OLIFF, Assistant Examiner

U.S. Cl. X.R.

56—328; 171—85